United States Patent [19]
Vandamme

[11] Patent Number: 5,833,284
[45] Date of Patent: Nov. 10, 1998

[54] SERVER FOR STRAND-SHAPED MATERIAL

[76] Inventor: Paul Vandamme, Pradostraat 16/3, B-1080 Molenbeek, Belgium

[21] Appl. No.: 849,685
[22] PCT Filed: Dec. 13, 1995
[86] PCT No.: PCT/EP95/05040
  § 371 Date: Jun. 12, 1997
  § 102(e) Date: Jun. 12, 1997
[87] PCT Pub. No.: WO96/18334
  PCT Pub. Date: Jun. 20, 1996

[30] Foreign Application Priority Data

Dec. 14, 1994 [BE] Belgium ................. 09401128

[51] Int. Cl.⁶ ............... A47G 21/00; A47J 43/28
[52] U.S. Cl. ................ 294/1.1; 294/5.5; 294/61
[58] Field of Search ............... 294/1.1, 7, 8, 5.5, 294/5, 15, 23.5, 26, 49, 50.6, 55.5, 61, 121; 30/123, 124, 128, 129, 137, 142, 322, 323; 81/3.45; 99/394, 395, 397, 419, 421 A; D7/653, 683, 688, 690

[56] References Cited

U.S. PATENT DOCUMENTS

| D. 28,445 | 4/1898 | Richardson ................. 30/322 X |
|---|---|---|
| 137,622 | 4/1873 | Ragan ........................... 294/61 |
| 166,171 | 7/1875 | White ............................ 294/61 |
| D. 274,207 | 6/1984 | Leangham ................... 294/5 X |
| 587,339 | 8/1897 | Stebbins ....................... 294/5 |
| 914,060 | 3/1909 | Menkin ........................ 30/137 |
| 2,775,477 | 12/1956 | Inouye . |
| 3,794,368 | 2/1974 | Majeske ....................... 294/5 |
| 5,005,293 | 4/1991 | Diamico . |
| 5,628,244 | 5/1997 | Holliday ................... 99/421 A |

FOREIGN PATENT DOCUMENTS

| 710802 | 8/1931 | France ........................... 294/61 |
|---|---|---|
| 2703231 | 10/1994 | France . |
| 463400 | 7/1928 | Germany . |
| 8704466 | 5/1987 | Germany . |

Primary Examiner—Johnny D. Cherry
Attorney, Agent, or Firm—Webb Ziesenheim Bruening Logsdon Orkin & Hanson, P.C.

[57] ABSTRACT

A server for picking up and discharging strand shaped material, like spaghetti. The invention has the object to provide a server for the easy bringing over of strand shaped material, like spaghetti, from a pot, pan or the like holder into another holder and/or on dishes. Therefore the server according to the invention is characterized by a screw-shaped food engaging portion.

8 Claims, 2 Drawing Sheets

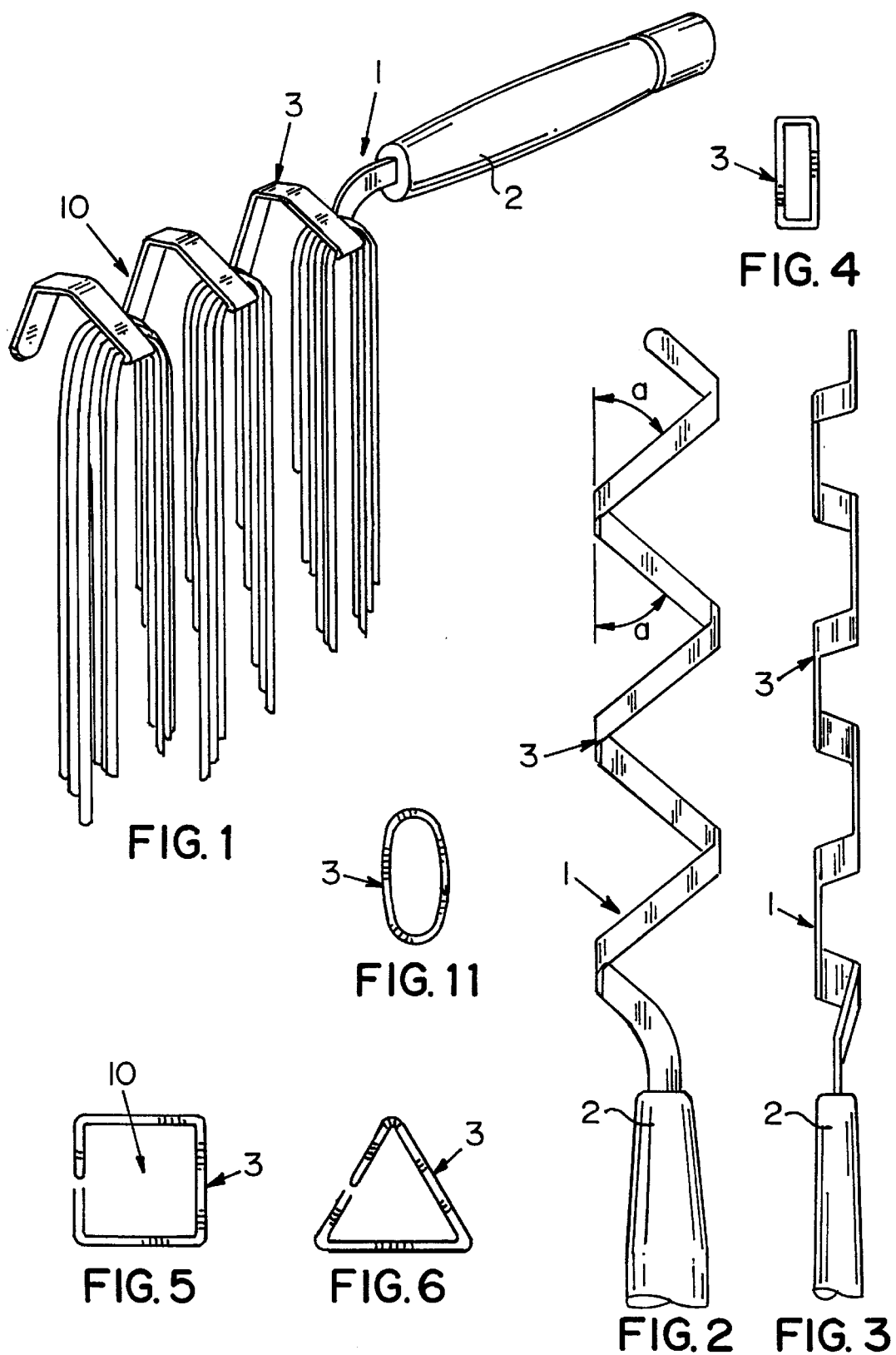

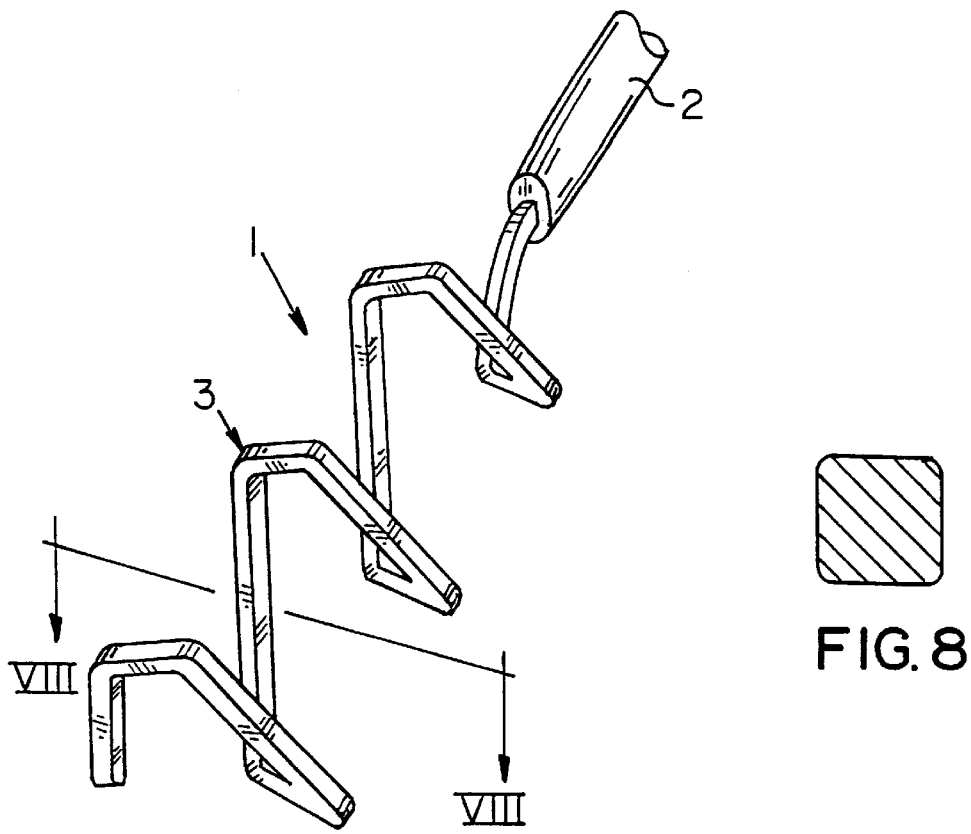
FIG. 7
FIG. 8
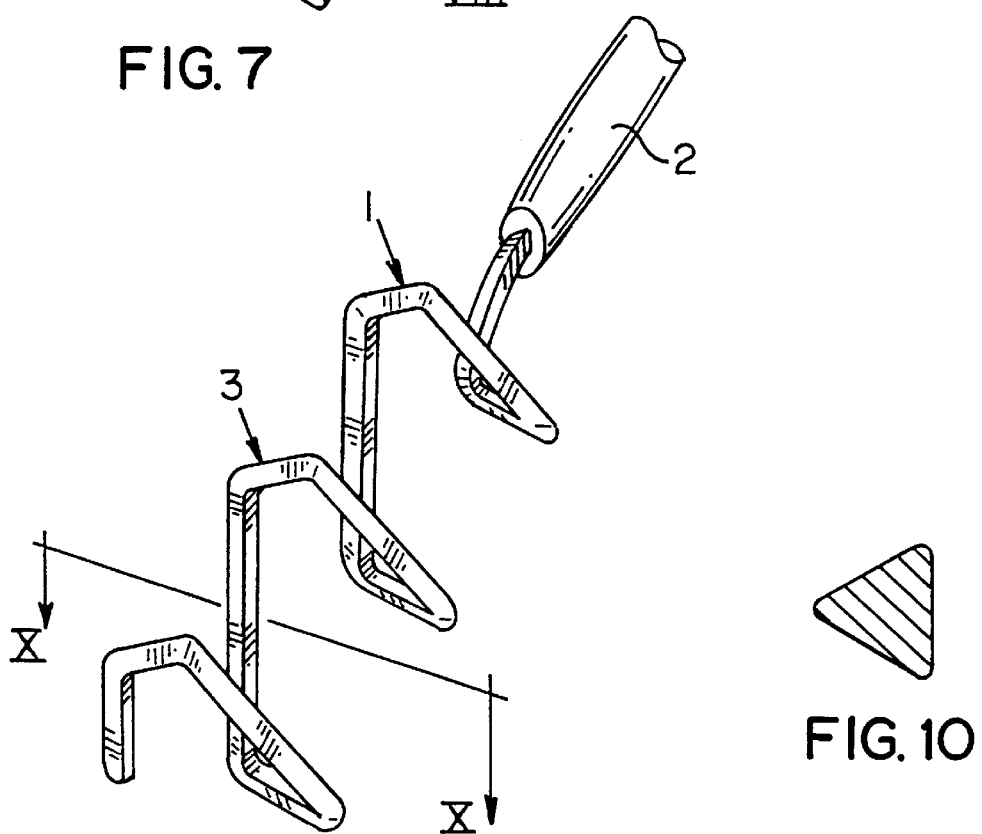
FIG. 9
FIG. 10

SERVER FOR STRAND-SHAPED MATERIAL

BACKGROUND OF THE INVENTION

The invention relates to a server for picking up and discharging strand shaped material, like spaghetti.

SUMMARY OF THE INVENTION

The invention has the object to provide a server for the easy bringing over of strand shaped material, like spaghetti, from a pot, pan or the like holder into another holder and/or on dishes. Therefore the server according to the invention is characterized by a screw.

BRIEF DESCRIPTION OF THE DRAWINGS

Said characterizing feature and other features will be elucidated in the following description with reference to the drawings, in which:

FIGS. 1, 7 and 9 each show a perspective view of servers according to the invention;

FIGS. 2, 3 and 4 show side and front views of the server of FIG. 1;

FIGS. 5, 6 and 11 are variations of FIG. 4; and

FIGS. 8 and 10 are cross sections along the lines VIII—VIII and X—X of FIGS. 7 and 9 respectively.

DESCRIPTION OF THE PREFERRED EMBODIMENTS

The servers of FIGS. 1, 7 and 9 each consist of a handle 2 having fixed thereto an unround food engaging portion screw or screw-shaped winding 3 with preferably three threads or coils. The winding bounds a food receiving space 10. However, the screw may be shorter or longer and have one, two, four or even more threads.

As shown in FIG. 2, the pitch angle a is preferably situated between 80° and 30°, more preferably between 60° and 35° and even better in the order of magnitude of 45°.

The screw 3 is preferably unround, e.g. square (FIG. 5), triangular (FIG. 6) or oval (FIG. 11). The rectangular screw of FIGS. 1, 7 and 9 operates particularly well. The screw is preferably made of a stainless steel bar plated with silver or not plated, having a square (FIG. 8), triangular (FIG. 10), round (not shown) or other cross section. Preferably a flat rectangular cross section is used (FIGS. 1–6).

Contrary to FIG. 1 the spaghetti strands in reality will extend in different directions and the jumble of strands will grow thicker and thicker by winding the more the server is rotated in the picking up direction. During discharge the server is rotated in the opposite direction.

I claim:

1. A server for picking up and discharging strand shaped material, said server comprising:

a handle; and a food engaging portion carried on the handle, wherein said food engaging portion bounds a food receiving space extending in a forward direction away from said handle, said food engaging portion comprising at least one winding having coils and extending around said food receiving space with an inclination relative to said forward direction such that said coils of said winding are mutually spaced, wherein an inside of said winding bounds said food receiving space, and wherein said food receiving space has an unround cross section transverse to the forward direction.

2. The server according to claim 1, wherein said winding of said food engaging portion bounds a food receiving space having a substantially rectangular cross section.

3. The server according to claim 1, wherein said winding of said food engaging portion has three coils.

4. The server according to claim 1, wherein a pitch angle of said food engaging portion is between 60°–35°.

5. The server according to claim 1, wherein said food engaging portion comprises a bar having a flat rectangular cross section.

6. A server for picking up and discharging strand shaped material, the server comprising:

a handle; and an elongated, substantially screw-shaped, non-cylindrical or non-conical food engaging portion extending from said handle.

7. The server according to claim 6, wherein a pitch angle of said food engaging portion is between 60°–35°.

8. The server according to claim 6, wherein said food engaging portion comprises a bar having a flat rectangular cross section.

* * * * *